US008239762B2

(12) United States Patent
Burstein et al.

(10) Patent No.: US 8,239,762 B2
(45) Date of Patent: Aug. 7, 2012

(54) METHOD AND SYSTEM FOR AUTOMATIC GENERATION OF ADAPTED CONTENT TO FACILITATE READING SKILL DEVELOPMENT FOR LANGUAGE LEARNERS

(75) Inventors: Jill C. Burstein, Princeton, NJ (US); John Sabatini, Cherry Hill, NJ (US); Jane Shore, Philadelphia, PA (US); Matthew Ventura, Ewing, NJ (US)

(73) Assignee: Educational Testing Service, Princeton, NJ (US)

( * ) Notice: Subject to any disclaimer, the term of this patent is extended or adjusted under 35 U.S.C. 154(b) by 1044 days.

(21) Appl. No.: 11/688,715

(22) Filed: Mar. 20, 2007

(65) Prior Publication Data

US 2007/0238076 A1 Oct. 11, 2007

Related U.S. Application Data

(60) Provisional application No. 60/783,897, filed on Mar. 20, 2006.

(51) Int. Cl.
*G06F 17/00* (2006.01)
*G06F 17/20* (2006.01)
(52) U.S. Cl. ............................. 715/264; 704/5; 704/277
(58) Field of Classification Search .................. 715/264; 704/5, 227
See application file for complete search history.

(56) References Cited

U.S. PATENT DOCUMENTS

| | | | | |
|---|---|---|---|---|
| 5,323,310 A | * | 6/1994 | Robinson | 704/2 |
| 5,608,622 A | * | 3/1997 | Church | 704/3 |
| 5,845,143 A | * | 12/1998 | Yamauchi et al. | 704/2 |
| 6,993,473 B2 | * | 1/2006 | Cartus | 704/2 |
| 7,054,803 B2 | * | 5/2006 | Eisele | 704/2 |
| 2002/0103632 A1 | * | 8/2002 | Dutta et al. | 704/2 |
| 2003/0061026 A1 | * | 3/2003 | Umpleby et al. | 704/8 |
| 2005/0058978 A1 | * | 3/2005 | Benevento | 434/362 |
| 2005/0187774 A1 | * | 8/2005 | Vuong | 704/277 |
| 2007/0055759 A1 | * | 3/2007 | McCoy et al. | 709/223 |
| 2007/0112554 A1 | * | 5/2007 | Goradia | 704/4 |
| 2007/0269775 A1 | * | 11/2007 | Andreev et al. | 434/156 |
| 2010/0042398 A1 | * | 2/2010 | Marcu et al. | 704/2 |

OTHER PUBLICATIONS

Max, Aurelien, "Multi-Language Machine Translation Through Interactive Document Normalization", 2003, Association for Computational Linguistics, pp. 25-32.*
Parton et al.,"Simultaneous Multilingual Search for Translingual Information Retrieval", ACM, 2008, pp. 719-728.*
Sadat et al, "Learning Bilingual Translations from Comparable Corpora to Cross-Language Information Retrieval: Hybrid Statistics-based and Linguistics-based Approach", Association for Computational Linguistics, 2003, pp. 57-64.*

(Continued)

*Primary Examiner* — Doug Hutton, Jr.
*Assistant Examiner* — James Debrow
(74) *Attorney, Agent, or Firm* — Jones Day

(57) ABSTRACT

Systems and methods are provided for adapting a text, for example, for generating a text appropriate for the proficiency level of a language learner, are described. An original text is received and at least one portion of the original text to adapt is identified, where the adapted text will facilitate reader comprehension. An adaptation to be applied to the at least one portion of the original text is determined. The at least one portion of the original text is analyzed based on the adaptation, the adaptation is applied to the at least one portion of the original text, and the adapted text is provided.

27 Claims, 2 Drawing Sheets

OTHER PUBLICATIONS

Burstein, J.; Classroom Tool for Automatic Generation of Adapted Content to Facilitate Reading Skill Development for ELLs; Princeton, NJ: Educational Testing Service; pp. 1-18; 2006.

Reed & Railsback; Strategies and Resources for Mainstream Teachers of English Language Learners; Booklet: By Request, Northwest Regional Educational Laboratory; Portland, OR; May 2003.

Lete et al.; MANULEX: A Grade-Level Lexical Database from French Elementary-School Readers; Behavior Research Methods, Instruments, & Computers; Psychonomic Society; 2004.

Short; How to Integrate Language and Content Instruction: A Training Manual; Center for Applied Linguistics; Second Edition; 1991.

Echevarria, et al.; Making Content Comprehensible for English Learners: the SIOP Model; Pearson Education, Inc.; Second Edition; 2004.

August; Supporting the Development of English Literacy in English Language Learners: Key Issues and Promising Practices; Report No. 61, The Johns Hopkins University; 2003.

Burstein, et al.; Toward Using Text Summarization for Essay-Based Feedback; Seventh Annual Conference for the Automatic Treatment of Natural Languages; 2000.

Gersten, et al.; Recent Research on Effective Instructional Practices for Content Area ESOL; in Promoting Learning for Culturally and Linguistically Diverse Students, Gersten and Jimenez (Eds.); Wadsworth Publishing Company, Belmot, CA; Ch. 4; pp. 57-72; 1998.

Echevarria; Preparing Text and Classroom Materials for English Language Learners: Curriculum Adaptations in Secondary School Settings; in Promoting Learning for Culturally and Linguistically Diverse Students, Gersten and Jimenez (Eds.); Wadsworth Publishing Company, Belmot, CA; Ch. 12; pp. 210-229; 1998.

* cited by examiner

METHOD AND SYSTEM FOR AUTOMATIC GENERATION OF ADAPTED CONTENT TO FACILITATE READING SKILL DEVELOPMENT FOR LANGUAGE LEARNERS

This application claims priority to U.S. Provisional Application Ser. No. 60/783,897 filed Mar. 20, 2006, the entire contents of which is hereby incorporated by reference herein.

BACKGROUND OF THE INVENTION

Having knowledge of a second language can be of great importance for a variety of reasons. For example, the ability to move from one country to another, whether for business or pleasure, has increased the interaction between people having different native tongues. Likewise, people are more able, and thus more likely, to relocate to new countries, for example, to seek opportunities that may be unavailable in their homelands. Accordingly, the number of people that are not fluent in a primary language spoken in the country in which they reside has increased in recent years.

In the United States, for example, many non-native English speakers seek to learn the English language as part of a typical school curriculum. Other non-native English speakers attempt to learn the English language simply to increase their ability to function in society. Even for those outside of the United States and/or other English-speaking countries, the ability to read, write and converse in English can provide numerous opportunities in, for example, the business and academic worlds.

Presently, when instructing a student that is a non-native speaker in learning a native language or when using a native language to provide instruction in another field such as mathematics, history, and the like, an instructor typically is unable to accommodate the student appropriately. For example, the ability to provide appropriate texts to English language learners (also, ELL students or students) of differing proficiencies has slowed the progress of English language instruction for non-native speakers. Obtaining texts that match each student's reading proficiency in order to facilitate the development of reading skills, content understanding and language development by each student has proven difficult. If such a text is unavailable, a teacher might need to adapt a text to the student's needs. Accordingly, the manual adaptation of texts has been proposed as a means of assisting ELL students at different levels of reading proficiency. See D. Short, "How to Integrate Language and Content Instruction: A Training Manual," Center for Applied Linguistics (1991) and J. Echevarria et al., "Making Content Comprehensible for English Language Learners: the SIOP Model," Pearson Education, Inc. (2004), each of which is incorporated herein by reference in its entirety. Manual text adaptation, including text support in the form of vocabulary strengthening and summarizing activities, has become wide-spread practice amongst content area teachers who teach EELs.

One problem with manually adapting texts is that the process is laborious. The amount of time required for a teacher or other person to modify a text to enable the ELL student to comprehend the information can be prohibitive. In addition, a teacher might not be conversant in the ELL student's native language and may not have access to another person that can interpret the text. As such, the teacher might not be able to provide an appropriate interpretation of the English text for the student.

When adapting texts, a number of approaches have been suggested for a teacher to help ELL students with language and content knowledge directed toward the improvement of reading skills. A number of research studies suggest that certain kinds of text modifications, specifically vocabulary expansion and elaboration, like the provision of synonyms and support of native language cognates (i.e., words which have the same spelling and meaning in two languages), can facilitate students' comprehension of content in a text. For example, vocabulary development is understood to be important to developing understanding in a content area. In addition, reading comprehension has been cited as being important to learning English. See J. Echevarria et al. (2004) and Reed, B. et al., "Strategies and Resources for Mainstream Teachers of English Language Learners," Northwest Regional Educational Laboratory (2003), each of which is incorporated herein by reference in its entirety. It has been shown that comprehension can be disrupted given a high proportion of unknown words. See D. August, "Supporting the Development of English Literacy in English Language Learners: Key Issues and Promising Practices," Report No. 61, The Johns Hopkins University (2003), which is incorporated herein by reference in its entirety.

Alternate methods of providing support for ELL students may include pairing ELL students having a low proficiency with ELL students having a high proficiency and a same native language background to assist the less proficient students. See R. Gertsen et al., "Recent Research on Effective Instructional Practices for Content Area ESOL," in "Promoting Learning for Culturally and Linguistically Diverse Students," R. Gertsen and R. Jimenez (eds.) (1998), which is incorporated herein by reference in its entirety. In addition, groups of teachers and/or other individuals may develop adapted texts. See J. Echevarria, "Preparing Text and Classroom Materials for English Language Learners: Curriculum Adaptations in Secondary School Settings," in "Promoting Learning for Culturally and Linguistically Diverse Students," R. Gertsen and R. Jimenez (eds.) (1998), which is incorporated herein by reference in its entirety.

However, none of these methods significantly reduces or eliminates the substantial amount of time and effort required to prepare adapted texts appropriate for ELL students. Moreover, adapting texts to meet the proficiency levels of numerous students requires a plurality of adaptations to be produced for a single text. This necessarily increases the amount of effort to be expended by those adapting texts.

What is needed is a method and system for enabling the rapid adaptation of texts for ELL students.

A need exists for a method and system that adapts texts based on the proficiency of an ELL student.

A further need exists for a method and system that can adapt text in a plurality of ways to provide an individualized adaptation for an ELL student.

The disclosed embodiments are directed to solving one or more of the above problems.

SUMMARY OF THE INVENTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It is also noted that as used herein and in the appended claims, the singular forms "a," "an," and "the" include plural references unless the context clearly dictates otherwise. Thus, for example, reference to a "text" is a reference to one or more texts and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

Automatic text adaptation may be produced to assist language learners in understanding content. In an embodiment, a language learner may be provided with a translation of a text into a native language as a replacement or supplement for the text. In an embodiment, a language learner may be provided with a translation of less than all of the text into a native language. Cognates may be identified and highlighted in the adapted text and supplemental translated text. Notes in the language learner's native language and/or the language of the adapted text may be presented to the language learner to assist in understanding the text. Translation and/or other adaptations may be performed automatically by a text adaptation device. Translation may be performed by a machine translation system. Other methods of adapting the text may also be performed within the scope of this disclosure.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION OF THE INVENTION

Figure 1:
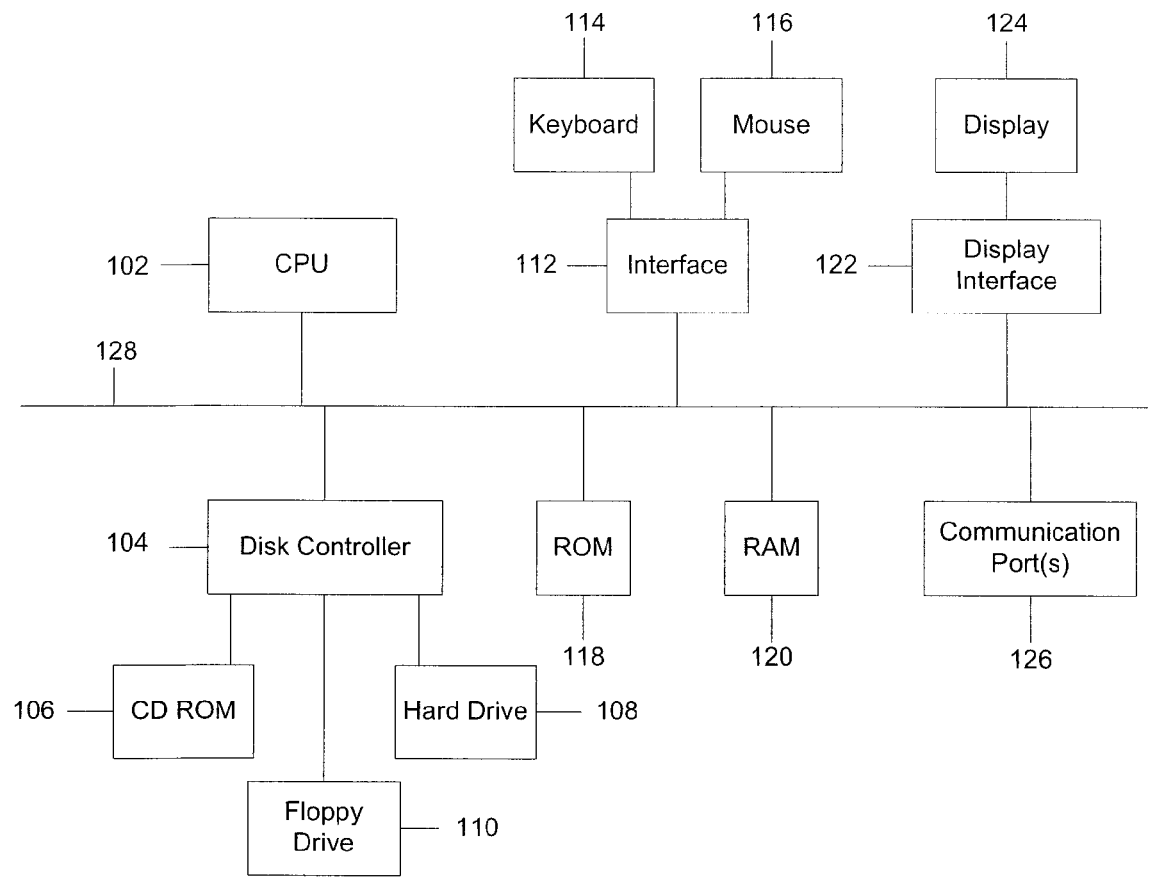
FIG. 1 depicts a block diagram of exemplary hardware that may be used to contain and/or implement the program instructions of a system embodiment.

Adaptation of content-relevant texts may be a useful way to communicate conceptual information of a text to one or more students learning a second language, such as English. Methods of instruction may include sheltered instruction, dual language instruction and bilingual instruction.

In sheltered instruction, teachers use specific strategies to teach a content area in ways comprehensible to students while promoting their English language development. For example, sheltered instruction may use simplified English in a classroom for students who don't speak English as a first language. Students may not specifically study English but may receive content-based instruction, such as math, science, or social studies, in simplified English. Each of these methods may incorporate native language support.

Dual language instruction and bilingual instruction may each involve teaching students to learn in two or more languages simultaneously. In dual language instruction, classes may be taught in two or more languages on alternating days. For example, a class may be taught in English on a first day and in Spanish on a second day.

In bilingual instruction, classes may be taught primarily in the native language of the student. Conversely, an "English as a second language" (ESL) classroom may be used to provide instruction in English only.

Text adaptation may be provided in each of the above-described instructional frameworks and may be performed in a plurality of ways. For example, native language texts may be offered to ELL students when discussing subject matter and/or answering questions. A native language text may be provided by translating the original text into an ELL student's native language. The native language text may be provided as either a replacement for or a supplement to the adapted English language text. In an embodiment, a summary of a full English language text may be provided to an ELL student. In an embodiment, the summary may include only key content to reduce the amount of translation required to adapt the text and/or increase the amount of interpretation required of the student.

In an embodiment of the present invention, a user is able to import text into a computer-based user interface, and subsequently automatically generate the following adaptations of the imported text: marginal notes in English and Spanish, vocabulary support, including synonym, antonym, and Spanish/English cognate identification, and English and Spanish text-to-speech synthesis. It will be appreciated that any language can be translated in accordance with the present invention.

In an embodiment, a native language text may represent a portion of the adapted text. For example, for a particular text, a percentage of the text may be selected for adaptation. Particular percentages (such as 20% or 40%) of the sentences in the adapted text may be selected. In an embodiment, sentences may be selected based upon their relevance to the subject matter of the text as a whole. In an embodiment, the relevance of each sentence may be assigned by a manual and/or an automatic process. For example, an instructor may assign a relative importance for each sentence in a text. In an alternate embodiment, an evaluation tool may determine, for example, thesis statements, supportive statements, and/or the like in the adapted text and select appropriate classes of statements for presentation to the student. The percentage of sentences may be manually selected based on the ELL student's language proficiency level. In an embodiment, a number of sentences and/or a relative importance for each sentence may additionally or alternately be used to select the sentences.

In an embodiment, the selected sentences may be translated. The selected sentences may be translated automatically and/or manually. Preferably, a machine translation program may be used to reduce the effort required to produce the translated sentences. The translated sentences may then be provided to an ELL student to aid in understanding the adapted text.

Moreover, cognates may be identified in the adapted text to assist with the ELL student's interpretation of the text and to further the development of the ELL student's English vocabulary. A cognate may refer to a word in a first language that descends from the same ancestral root or is otherwise related in origin to a word in a genetically related second language. In an embodiment, a cognate list may be used to match English words in a text to cognates in the student's native language. In an embodiment, an output from a machine translation system may be used.

In addition, in an embodiment, synonyms for words in the text that have a Standard Frequency Index (SFI) of less than or equal to 60 are identified. This particular number, 60, indicates that the word appears once in 10,000 words, or less frequently if the SFI is lower. Words with SFIs of 60 of lower are less frequent words, and are likely to represent more difficult vocabulary. It will be appreciated that another threshold value can be used in identifying frequency of words. In the embodiment, a user can select two kinds of synonym options in a user interface: basic or challenge. If the basic synonym option is selected, then a synonym that is easier than the original word will be generated. If the challenge synonym is selected, then synonyms are generated if they have a lower SFI than the original word, indicating that they are less frequent, more difficult words. In an embodiment, all synonyms are identified using a statistically generated word similarity matrix (Lin, 1998) originally used in c-rater (Leacock & Chodorow, 2003) for synonym identification. This method of synonym identification detects words that occur in similar contexts using probabilistic methods.

In an embodiment, antonyms for vocabulary in the text using WordNet® are generated. In this embodiment, antonyms for all words in the imported text are generated once the user selects the antonym option from a user interface.

An alternate method of adapting a text may include automatically identifying and highlighting portions of an English language text. For example, the main ideas and/or key concepts presented in a text may be highlighted. This may permit ELL students to narrow their focus to the salient points in the text and reduce the need for interpreting and/or understanding the text in its entirety.

Another method of adapting a text may include creating notes in the margin of an English language text. The notes may include information presented in English and/or the ELL student's native language. Marginal notes in English provide a language learner with a compressed (summarized) version of the full, original text, similar in nature to a teacher producing a summary by hand. In one embodiment of the invention, the user is able to select on a user interface varying amounts of marginal notes depending on how much text the user should be exposed to. For example, a user with a more beginning level of English competency may select a smaller amount of marginal notes to be shown. The most important, or main ideas, are the first to appear when the option for the least amount of notes is selected. As increasingly more notes are introduced, more and more detailed information from the original text appears. In one embodiment, the technology underlying the production of marginal notes in English is an automated summarization tool. See Marcu, 2000. Each of the seven buttons on the user interface corresponds to a predetermined text compression rate: Button 1=20%; Button 2=40%; Button 3=50%; Button 4=60%; Button 5=70%; Button 6=80%; Button 7=100%. An algorithm in the summarization tool ranks the relative importance of the sentences in the original text. Alternately, a handout may be provided with the adapted text that provides hints regarding the location of key content. In this manner, ELL students may again narrow their focus to the relevant portions of the text.

In an embodiment, a system for adapting texts for ELL students may include a machine translation system, such as the Statistical Machine Translation Software from Language Weaver, Inc., that creates native language texts. In an embodiment, a method for adapting texts may identify main ideas and/or key concepts. In an embodiment, a method for adapting texts may generate marginal notes by performing statistical methods that analyze the importance of words in a text. In an embodiment, text summaries may be generated using automatic summarization programs, such as the one described in J. Burstein et al., "Towards Using Text Summarization for Essay-Based Feedback," in The Seventh Annual Conference for the Automatic Treatment of Natural Languages (2000), which is incorporated herein by reference in its entirety.

Text adaptations may be used in a classroom setting to assist in developing reading, content and language skills. Moreover, text adaptations may be used to generate pre-reading questions for ELL students and/or comprehension questions about particular readings.

In an embodiment, English and Spanish text-to-speech (TTS) synthesis systems can be accessed by a user from the user interface. These systems will produce a machine reading of an English or Spanish text. The user selects a sentence in the text from a user interface that he would like the system to read.

While the above has been described in reference to ELL students, it will be apparent to one of ordinary skill in the art that the same or similar steps and/or devices may be used to perform text adaptation for those learning other languages as well. Such steps and devices are included within the scope of the disclosed embodiments and disclosure.

FIG. 1 depicts a block diagram of exemplary hardware that may be used to contain and/or implement the program instructions of a system embodiment. Referring to FIG. 1, a bus 128 serves as the main information highway interconnecting the other illustrated components of the hardware. CPU 102 is the central processing unit of the system, performing calculations and logic operations required to execute a program. Read only memory (ROM) 118 and random access memory (RAM) 120 constitute exemplary memory devices.

A disk controller 104 interfaces with one or more optional disk drives to the system bus 128. These disk drives may be external or internal floppy disk drives such as 110, CD ROM drives 106, or external or internal hard drives 108. As indicated previously, these various disk drives and disk controllers are optional devices.

Program instructions may be stored in the ROM 118 and/or the RAM 120. Optionally, program instructions may be stored on a computer readable medium such as a floppy disk or a digital disk or other recording medium, a communications signal or a carrier wave.

An optional display interface 122 may permit information from the bus 128 to be displayed on the display 124 in audio, graphic or alphanumeric format. Communication with external devices may optionally occur using various communication ports 126. An exemplary communication port 126 may be attached to a communications network, such as the Internet or an intranet.

In addition to the standard computer-type components, the hardware may also include an interface 112 which allows for receipt of data from input devices such as a keyboard 114 or other input device 116 such as a remote control, pointer and/or joystick.

An embedded system may optionally be used to perform one, some or all of the described operations. Likewise, a multiprocessor system may optionally be used to perform one, some or all of the described operations.

Figure 2:
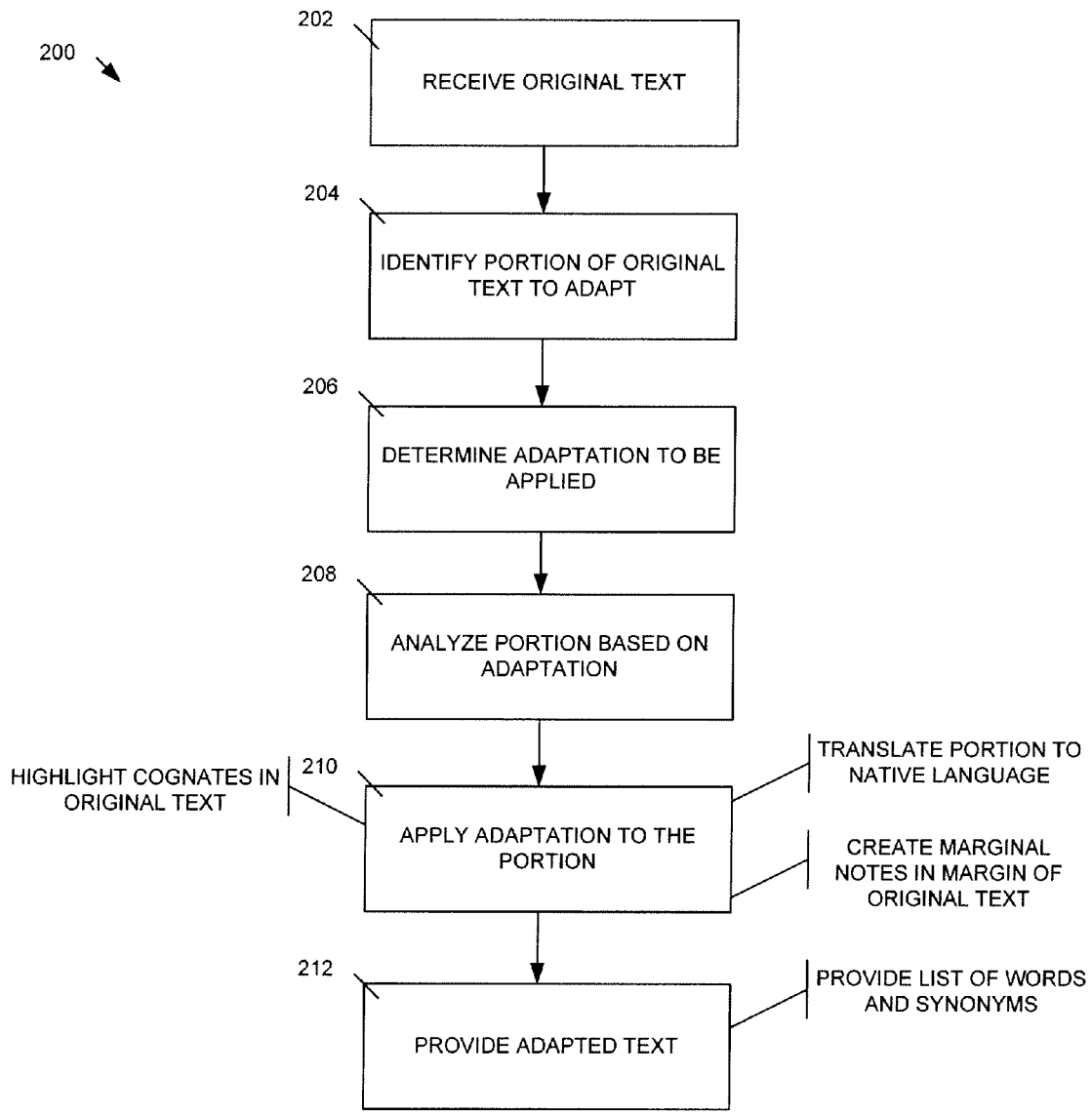
FIG. 2 depicts a method for adapting a text.

For example, FIG. 2 depicts a method for adapting a text that includes electronically receiving 202 an original text and identifying 204 at least one portion of the original text to adapt, wherein the adapted text will facilitate reader comprehension. At 206, an adaptation to be applied to the at least one portion of the original text is determined in order to generate adapted text. At 208, the at least one portion of the original text is analyzed based on the adaptation. At 210, the adaptation is applied to the at least one portion of the original text. The adaptation may include translating the portion of the original text to a native language, creating marginal notes in the margin of the original text, and highlighting cognates in the original text. The adapted text is provided at 212, where providing the adapted text may include providing a list of words and synonyms.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those of ordinary skill in the art which are also intended to be encompassed by the disclosed embodiments.

What is claimed is:

1. A method for adapting a text, the method comprising:
   electronically receiving an original text;
   determining a relevance value for a plurality of sentences in the original text, wherein a higher relevance value is assigned to sentences with more relevance to subject matter of the original text;
   identifying at least one portion of the original text to adapt based on the relevance values for the plurality of sentences and based on a language proficiency level of a reader;
   determining an adaptation to be applied to the at least one portion of the original text in order to generate adapted text to facilitate reader comprehension;
   applying the adaptation to the at least one portion of the original text;
   wherein the adaptation includes identifying a difficult word in the original text with a measure of difficulty meeting a preselected value, and determining one or more synonyms of the identified difficult word;
   displaying the adapted text; and
   automatically displaying a marginal note along with the adapted text wherein the marginal note includes the one or more synonyms of the identified difficult word.

2. The method of claim 1, further comprising determining a native language to be used when applying the adaptation to the at least one portion of the original text.

3. The method of claim 2, wherein the adaptation to be applied is a translation of the at least one portion of the original text into the native language.

4. The method of claim 3, wherein a machine translation program is used to translate the at least one portion of the original text into the native language.

5. The method of claim 2, further comprising:
   automatically displaying an additional marginal note along with the adapted text, wherein the additional marginal note notes arc summaries includes a summary of the original text.

6. The method of claim 5, wherein the marginal note and the additional marginal note are provided in a margin of the original text.

7. The method of claim 6, wherein the marginal note and the additional marginal note are translated into the native language and provided in the native language in the margin of the original text.

8. The method of claim 2, wherein the adaptation to be applied is the identification of each cognate in the original text based on the native language.

9. The method of claim 8, wherein the adapted text provided is a list of each cognate identified in the original text.

10. The method of claim 8, wherein each cognate is highlighted in the original text.

11. The method of claim 8, wherein a cognate is highlighted in the adapted text based on that cognate being identified as a cognate in the original text.

12. The method of claim 1, wherein the adapted text is a native language text.

13. The method of claim 1, wherein determining at least one portion of the original text comprises dividing the original text into sentences.

14. The method of claim 13, wherein the at least one portion of the original text is determined based on selecting a percentage of the total number of sentences.

15. The method of claim 1, further comprising determining the frequency which one or more words appears in a corpus of documents.

16. The method of claim 15, wherein the determination comprises identification of each word in the original text with a Standard Frequency Index (SFI) of less than or equal to a preselected value.

17. The method of claim 16, wherein at least one synonym is generated for each word identified.

18. The method of claim 17, wherein the adapted text provided is a list of each word in the original text with an SFI of less than or equal to the preselected value, and its synonym.

19. The method of claim 16, wherein the preselected value is 60.

20. The method of claim 1, further comprising identifying a thesis statement sentence, wherein the identified thesis statement sentence is assigned a high relevance value.

21. A system for automatically adapting a text comprising:
    an input device for electronically receiving an original text;
    a processor for determining a relevance value for a plurality of sentences in the original text, wherein a higher relevance value is assigned to sentences with more relevance to subject matter of the original text and identifying at least one portion of the original text to adapt based on the relevance values for the plurality of sentences and based on a reader's language proficiency level;
    wherein the processor applies an adaptation to the at least one portion of the original text in order to provide adapted text to facilitate reader comprehension;
    wherein the adaptation includes identifying a difficult word in the original text with a measure of difficulty meeting a preselected value, and determining one or more synonyms of the identified difficult word;
    wherein applying the adaptation includes automatically displaying a marginal note along with the adapted text wherein the marginal note includes the one or more synonyms of the identified difficult word.

22. The system of claim 21, further comprising a display interface for displaying the adapted text in audio, graphic or alphanumeric format.

23. The system of claim 21, wherein the processor further determines a native language to be used when applying the adaptation to the at least one portion of the original text.

24. The system of claim 23, wherein the adaptation is a translation of the at least one portion of the original text into the native language.

25. The system of claim 24, further comprising a machine translation program to translate the at least one portion of the original text into the native language.

26. A device for automatically adapting a text comprising:
an input device for electronically receiving an original text;
a processor for determining a relevance value for a plurality of sentences in the original text, wherein a higher relevance value is assigned to sentences with more relevance to subject matter of the original text, and identifying at least one portion of the original text to adapt based on the relevance values for the plurality of sentences and based on a reader's language proficiency level
wherein the processor applies an adaptation to the at least one portion of the original text in order to provide adapted text to facilitate reader comprehension;
wherein the adaptation includes identifying a difficult word in the original text with a measure of difficulty meeting a preselected value, and determining one or more synonyms of the identified difficult word;
wherein applying the adaptation includes automatically displaying a marginal note along with the adapted text wherein the marginal note includes the one or more synonyms of the identified difficult word; and
an interface for presenting the adapted text in at least one of a graphic or alphanumeric format.

27. A non-transitory computer-readable storage medium comprising programming instructions for causing a processing system to perform a method for adapting a text, the method comprising:

electronically receiving an original text;
determining a relevance value for a plurality of sentences in the original text, wherein a higher relevance value is assigned to sentences with more relevance to subject matter of the original text;
identifying at least one portion of the original text to adapt based on the relevance values for the plurality of sentences and based on a language proficiency level of a reader;
determining an adaptation to be applied to the at least one portion of the original text in order to generate adapted text to facilitate reader comprehension;
applying the adaptation to the at least one portion of the original text;
wherein the adaptation includes identifying a difficult word in the original text with a measure of difficulty meeting a preselected value, and determining one or more synonyms of the identified difficult word;
displaying the adapted text; and
automatically displaying a marginal note along with the adapted text wherein the marginal note includes the one or more synonyms of the identified difficult word.

* * * * *